(12) United States Patent
Bailey et al.

(10) Patent No.: US 11,274,687 B2
(45) Date of Patent: Mar. 15, 2022

(54) LIQUID JUNCTION ASSEMBLY

(71) Applicant: Trajan Scientific Australia Pty Ltd, Victoria (AU)

(72) Inventors: Michael Bailey, Tacoma, WA (US); Brett R. Barnett, Victoria (AU); Paul S. Griffiths, Victoria (AU)

(73) Assignee: Trajan Scientific Australia Pty Ltd, Victoria (AU)

( * ) Notice: Subject to any disclaimer, the term of this patent is extended or adjusted under 35 U.S.C. 154(b) by 913 days.

(21) Appl. No.: 15/614,874

(22) Filed: Jun. 6, 2017

(65) Prior Publication Data

US 2017/0350429 A1 Dec. 7, 2017

(30) Foreign Application Priority Data

Jun. 6, 2016 (AU) .................................. 2016902196

(51) Int. Cl.
| | |
|---|---|
| *F15D 1/02* | (2006.01) |
| *F16L 13/02* | (2006.01) |
| *F16L 13/10* | (2006.01) |
| *F16L 15/00* | (2006.01) |
| *G01N 30/60* | (2006.01) |
| *G01N 30/72* | (2006.01) |

(52) U.S. Cl.
CPC .............. *F15D 1/025* (2013.01); *F16L 13/02* (2013.01); *F16L 13/103* (2013.01); *F16L 15/00* (2013.01); *G01N 30/6004* (2013.01); *G01N 30/6026* (2013.01); *G01N 30/6034* (2013.01); *G01N 30/6095* (2013.01); *G01N 30/7233* (2013.01); *G01N 2030/6013* (2013.01)

(58) Field of Classification Search
CPC ................ F15D 1/025; G01N 30/6026; G01N 30/6004; F16L 15/00; F16L 13/02; F16L 13/103

See application file for complete search history.

(56) References Cited

U.S. PATENT DOCUMENTS

| | | | | |
|---|---|---|---|---|
| 4,232,702 A | * | 11/1980 | Geil | ..................... B41J 2/16526 137/115.16 |
| 5,234,235 A | * | 8/1993 | Worden | .................. F16L 29/04 285/334.4 |
| 6,095,572 A | * | 8/2000 | Ford | ................... G01N 30/6039 285/361 |
| 6,267,143 B1 | * | 7/2001 | Schick | ................... G01N 30/20 137/625.11 |
| 6,443,179 B1 | * | 9/2002 | Benavides | ................ F15C 5/00 137/454.2 |

(Continued)

FOREIGN PATENT DOCUMENTS

WO    WO-2010073473 A1 *  7/2010  ............. F16L 23/20

*Primary Examiner* — James M Hewitt, II
(74) *Attorney, Agent, or Firm* — Fulwider Patton LLP

(57) ABSTRACT

A liquid junction assembly for providing a flow connection between two tubular conduits. The assembly includes respective bodies configured to define elongated passages of respective first and second cross sections to receive and locate the respective tubular conduits, a plate with at least one hole therethrough of a third cross section smaller than the first and second cross sections, and a seat for the plate, defined in a face of one or both of the bodies. The bodies and the plate are assembled with the plate in the seat and the elongated passages and the hole aligned along a common axis.

13 Claims, 5 Drawing Sheets

(56) References Cited

U.S. PATENT DOCUMENTS

| | | | | |
|---|---|---|---|---|
| 7,311,882 | B1* | 12/2007 | Renzi | B01L 3/565 |
| | | | | 285/120.1 |
| 7,845,688 | B2* | 12/2010 | Gallagher | F16L 9/147 |
| | | | | 285/412 |
| 2006/0038402 | A1* | 2/2006 | Norman | F16L 15/009 |
| | | | | 285/384 |
| 2012/0119491 | A1* | 5/2012 | Rosch | G01N 30/0005 |
| | | | | 285/342 |
| 2015/0198187 | A1* | 7/2015 | Goodwin | F15D 1/025 |
| | | | | 138/40 |
| 2015/0362105 | A1* | 12/2015 | Nagase | G01F 1/42 |
| | | | | 285/211 |

* cited by examiner

LIQUID JUNCTION ASSEMBLY

CROSS-REFERENCES TO RELATED APPLICATIONS

This application claims priority from Australian Patent Application No. 2016902196, filed Jun. 6, 2016 incorporated by reference in its entirety.

FIELD OF THE INVENTION

This invention relates generally to the joining of tubular conduits and more particularly to the joining of conduits of the scale employed in analytic systems such as liquid chromatography and mass spectrometry. The invention is especially useful where the tubular conduits are capillaries of submillimeter inner diameter, especially those involving nanoscale analytic volumes.

BACKGROUND

Problems commonly arise in liquid chromatography from the dead volumes that can be created by any of the myriad of connections from the injection port to the column and from the column to the detector. Dead volume, or the lack thereof, is extremely critical after the column until the sample reaches the detector. These problems are exacerbated with capillary and low micro and nano-liquid chromatography mass spectrometry where bad connections can lead to a total failure of the experiment. The typical low flow rates in these applications make them exceptionally sensitive to dead volumes. While there has been significant development of minimal dead volume and ultra high pressure liquid chromatography (UHPLC) fittings to optimise simple connections (e.g. the Thermo NanoViper, the IDEX MarvelX fittings, and the Optimze Technologies EXP2 fittings), there are currently no reliable minimal dead volume unions for joining two capillaries.

Current such unions, or 'liquid junctions', currently comprise a tubular body with axially aligned cylindrical passages to receive the respective capillaries. The passages are separated at the center of the body by a web in which is drilled a very small hole at the axial center line, to join the passages and thereby the bores of the capillaries. In a typical such system, the passage may be of 0.9 mm diameter and the hole 50 µm. The current manufacturing method entails drilling the hole using a drill bit or a laser beam. These methods are limited due to the distance from the end of the passage in the fitting to the web to be drilled. Typical limitations with mechanical drilling using drill bits range from approximately 75 to 200 µm and greater, depending on the capabilities of the machine shop, equipment used and drill bit sizes. Typical limitations of laser drilling are in the 30-60 µm range due to the distance of the laser head from the web in which the through hole is laser drilled. Correctly positioning the hole within, e.g., 50 µm of the center line is challenging, as alignment of the laser is done by camera and eye and is thus operator dependent. The laser beam must not touch the sides of the access passage, thus reducing cutting power. It is also difficult to flow the necessary gas down the hole for laser cutting. All of these factors impact the position of the through hole, which is quite critical in such small inner diameters of tubing that are used with the liquid junction.

Another method currently used is to drill a large hole to accommodate the OD of the tubing, or in some instances tubing with an additional outer sleeve to increase the OD to fit through the larger drilled through hole. The tubing coming in from both sides is then butted together. This again can cause dead volume, should both tubes not fit exactly flush together, or even cause blockage due to hole misalignment. This method also relies on the user positioning each tube exactly half way in the fitting, in the case of a coned port union, so there is enough tubing protruding past the ferrule for it to bite or have purchase onto the tubing.

It is an object of the invention to achieve a liquid junction especially adaptable at the micro or nanoscale in which the necessary hole accuracy is more easily achieved than with the aforementioned prior arrangements.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

The invention broadly entails the concept of providing the required hole at the actual liquid junction by means of a discrete holed plate or shim element in place of the conventional integral web.

The invention accordingly provides, in one aspect, a liquid junction assembly for providing a flow connection between two tubular conduits, comprising:

respective bodies configured to define respective elongated passages of respective first and second cross sections to receive and locate the respective tubular conduits;

a plate with at least one hole therethrough of a third cross section smaller than said first and second cross sections; and a seat for the plate, defined in a face of one or both of said bodies;

wherein the bodies and the plate are assembled with the plate in the seat and the elongated passages and the hole aligned along a common axis.

In a second aspect, the invention provides a kit for a liquid junction assembly for providing a flow connection between two tubular conduits, comprising:

respective bodies configured to define elongated passages of respective first and second cross sections to receive and locate the respective tubular conduits;

a plate with at least one hole therethrough of a third cross section smaller than said first and second cross sections; and a seat for the plate, defined in a face of one or both of said bodies;

wherein the bodies and the plate are adapted to be assembled with the plate in the seat and the elongated passages and the hole aligned along a common axis.

In an embodiment, the respective bodies are discrete bodies but in other embodiments they may be portions of a single integral body.

The bodies and the plate may be assembled or adapted to be assembled together by a screw, thread or other mechanical connection between the bodies that traps the plate in the seat between the bodies. In an alternative arrangement, the bodies and optionally also the plate are diffusion bonded, or welded, to form the assembly. In another alternative arrangement, such as could be the case if glass were the body material, or body and plate material, heat or heat and pressure could be applied to bond the pieces together. Yet another arrangement involves the use of an adhesive to bond the pieces together such as in the case of a polymer used in the body material, or body and plate material.

The elongated passages are typically cylindrical. The first and second cross sections may be equal or different for joining conduits of the same or different sizes.

The plate is preferably a disc. The disc may for example be 25-100 μm thick and may be in any of a variety of materials including a metallic material such as 300 or 400 series stainless steel or titanium, a ceramic, a glass such as borosilicate or quartz, or a polymer such as PEEK or filled PEEK.

The plate may contain a single hole, or a series or matrix of holes. The series of holes might be used in conjunction with multi-lumen tubing and/or a combination of tubing and emitter tips.

The assembly or the components of the kit are preferably configured so that when the conduits are correctly located in the elongated passages, they squarely abut the respective sides of the plate so as to minimize any dead space and to accurately align the inner diameters of the conduits with the hole or holes in the plate. To that end, the plate preferably exhibits smooth parallel faces about the hole or holes.

Each hole is typically of uniform circular cross section. The hole or holes may be drilled by any suitable means including a laser or ultrasound drill or formed in a drawing process in the case of a material such as glass.

For application to the joining of capillary or nanoscale columns, for example in liquid chromatography and detection such as mass spectrometry, the elongated passages are preferably of a diameter in the range of 0.5 mm-2 mm. The hole may be of a diameter in the range 10 μm-200 μm, for example in the range 30-100 μm.

The liquid junction assembly may typically be incorporated in a coupling assembly by which the conduits may be securely joined within the liquid junction assembly. Such a coupling may include, for example, threaded components configured to be clamped onto the respective conduits, preferably by application of finger force without assistance from external tools.

As used herein, except where the context requires otherwise, the term "comprise" and variations of the term, such as "comprising", "comprises" and "comprised", are not intended to exclude further additives, components, integers or steps.

These and other features and advantages of the present invention will become apparent from the following detailed description of preferred embodiments which, taken in conjunction with the accompanying drawings, illustrate by way of example the principles of the invention.

DETAILED DESCRIPTION OF THE PREFERRED EMBODIMENTS

Figure 1:
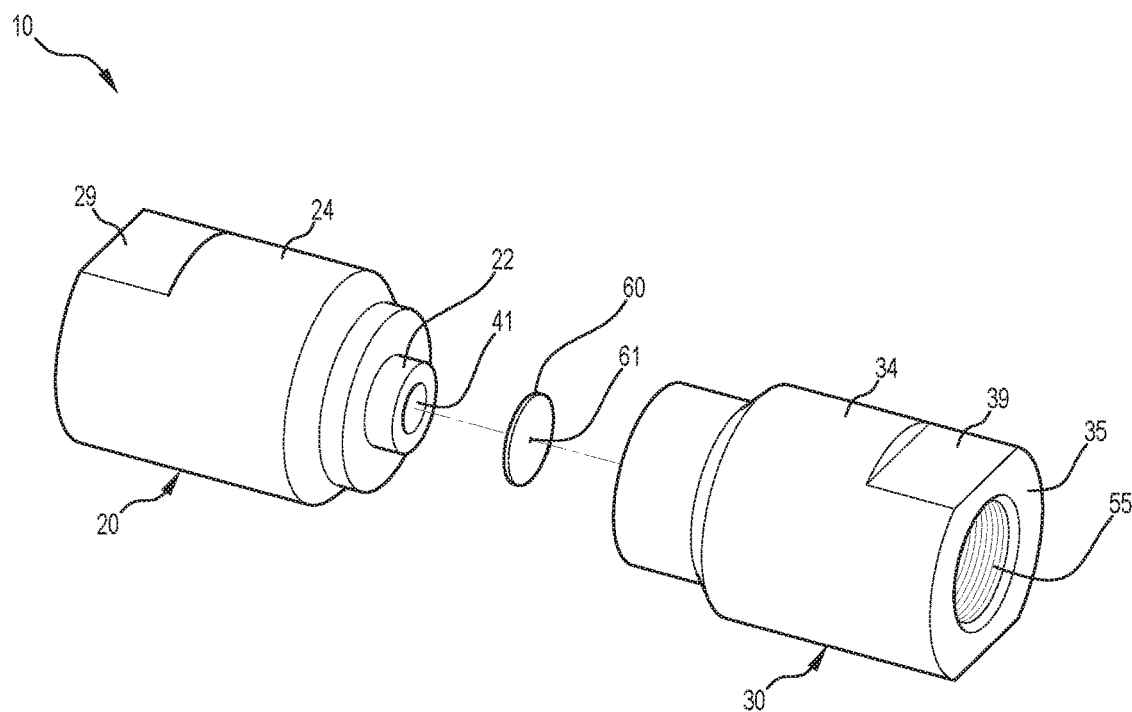
FIG. 1 is an exploded perspective view of a liquid junction assembly according to an embodiment of the invention.
Figure 2:
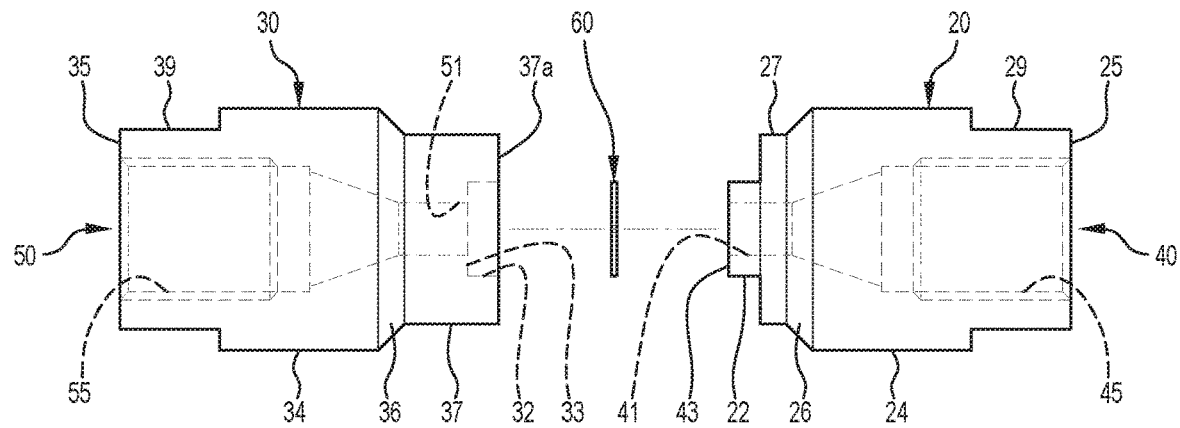
FIG. 2 is a side elevational view corresponding to FIG. 1 but viewed from the other side.
Figure 2A:
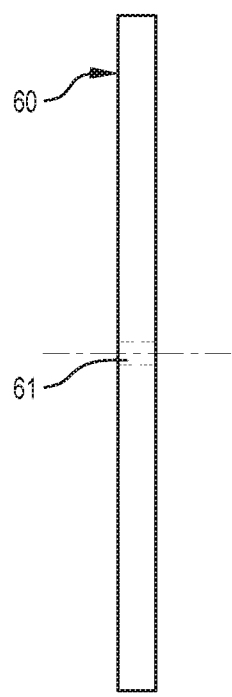
FIG. 2A is an enlarged cross-sectional view of the disc component.
Figure 3:
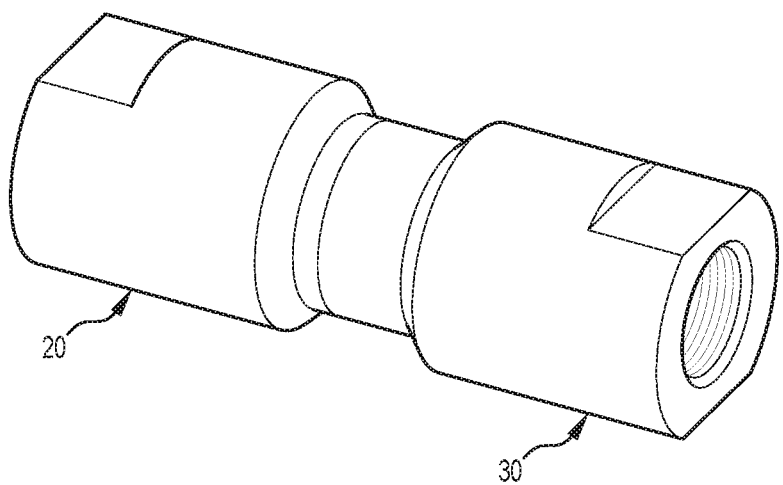
FIG. 3 is a perspective view similar to FIG. 1 of the assembled components.
Figure 4:
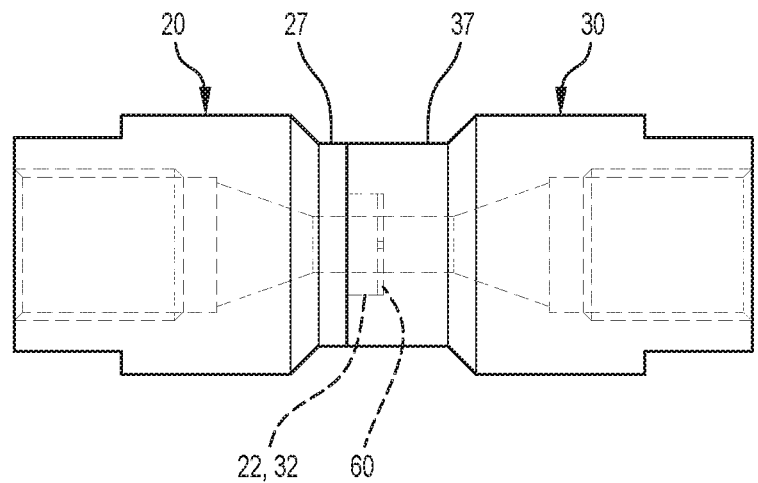
FIG. 4 is a side elevational view similar to FIG. 2 of the assembled components.
Figure 5:
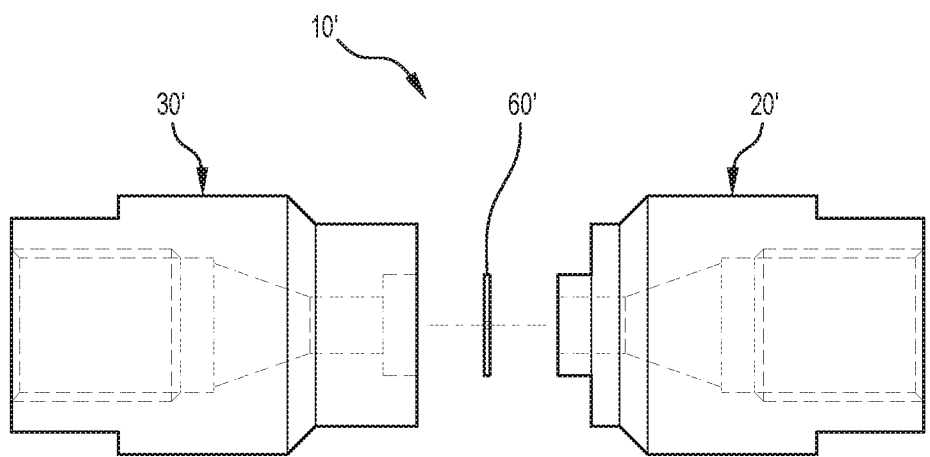
FIG. 5 is a side elevational view similar to FIG. 2 of a modified embodiment in which the respective body components are adapted for a different coupling system.
Figure 6:
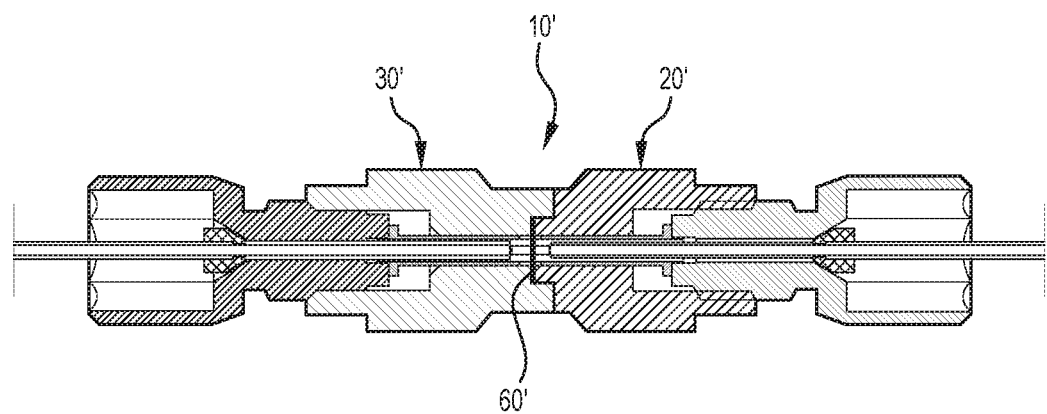
FIG. 6 is a cross-sectional view of the liquid junction assembly of FIG. 1-4 or 5 in situ in a first coupling assembly joining two capillary tubes such as a column to an emitter tip, a tube to an emitter tip, or a column to a tube.
Figure 7:
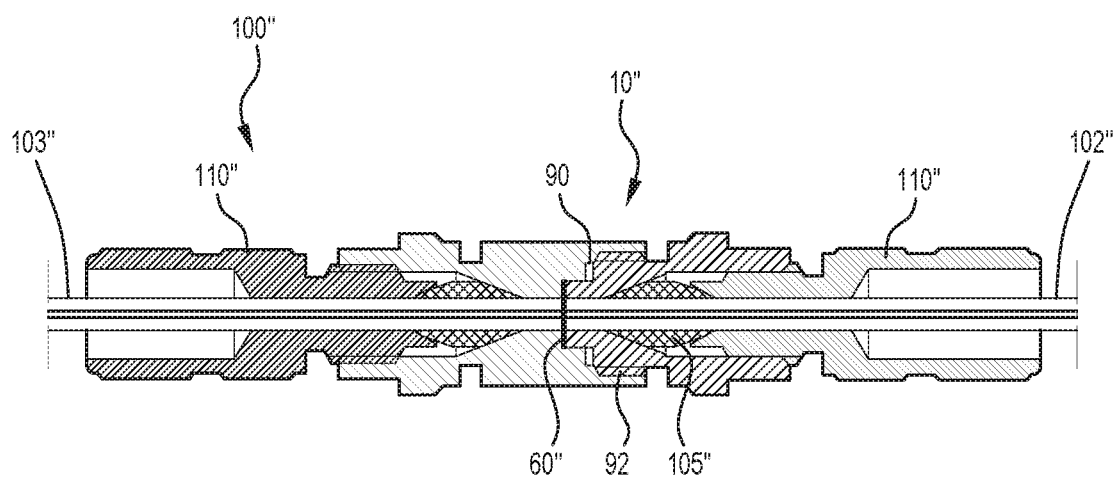
FIG. 7 is a cross-sectional view of the liquid junction assembly of FIG. 1-4 or 5 in situ in a second coupling assembly joining two capillary tubes such as a column to an emitter tip, a tube to an emitter tip, or a column to a tube.
Figure 8:
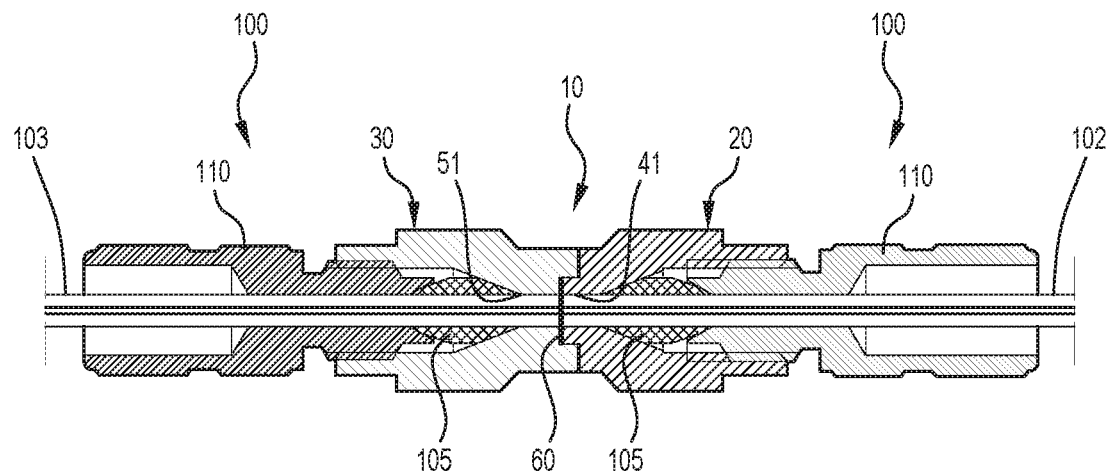
FIG. 8 is a cross-sectional view of the liquid junction assembly of FIG. 1-4 or 5 in situ in a third coupling assembly joining two capillary tubes such as a column to an emitter tip, a tube to an emitter tip, or a column to a tube.

Embodiments of a liquid junction assembly according to the invention are illustrated in FIGS. 1-5 and 9, and their incorporation in coupling assemblies for capillary columns in liquid chromatography and mass spectrometry is depicted in FIGS. 6-8.

The liquid junction assembly 10 of FIGS. 1-4 includes a pair of generally cylindrical bodies 20, 30 that are of similar configuration and coupled together by engagement of a reduced diameter spigot portion 22 on body 20 with a matching circular recess 32 on body 30. Each body 20, 30 has a main portion 24, 34 of greatest diameter extending from an outer end face 25, 35, joined by an optionally tapered portion 26, 36 to a reduced diameter inner portion 27, 37. In the case of body 20, spigot 22 of further reduced diameter extends from portion 27 to an end face 43 that forms the innermost end of the body, while for body 30 the reduced diameter portion 37 extends to an inner end face 37a of the body, in which recess 32 is formed.

Extending coaxially through the respective bodies 20, 30 are bores 40, 50 that form elongated passages 41, 51 of respective but in this case equal diameters within reduced diameter portions 27, 37 and respectively open into the end face 43 of spigot 22 and into recess 32. In other embodiments, the diameters of passages 41, 51 may not be equal so as to accommodate tubes or columns of different OD. At their outer ends, the bores 40, 50 are counterbored to provide enlarged threaded sockets 45, 55 for securing the respective bodies to components of a column coupling assembly 100 in the manner depicted in FIG. 8. In this case, the coupling assembly is a pair of SGE SilTite™ ferrule and nut couplings. The middle portion 26 of bore 40, 50 is tapered to accommodate the biconical ferrule 105 of this coupling, as illustrated in FIG. 8.

Instead of being female threaded sockets, elements 45, 55 could be male threads for use with female nuts.

The outer ends of main body portions 24, 34 of the bodies includes opposite flats 29, 39 for tool engagement.

Located or trapped in recess 32 between the end face 43 of spigot 22 and the annular inner face 33 of the seat 32 is a plate, shim or wafer 60 in the form of a circular, in this case metallic, disc. The disc may typically be about 70 μm thick and has been laser drilled with a small central hole 61 sized to match the inner diameter of the capillary columns to be joined by the assembly, or to allow for optimized separation and detection performance. Typical diameters of the hole 61 are 25 or 50 μm for current commercial capillary or nano columns. In this case, disc 60 may typically be of a diameter in the range 1.2 to 2.0 mm.

In this embodiment, the three components, the bodies 20, 30 and the disc 60, are diffusion welded to form a unitary unit at the interfaces of reduced diameter portions 27, 37 and between the end face 43 of the spigot 22, the disc 60 and the annular inner face 33 of recess 32. In use, the assembly is incorporated as previously described within a coupling assembly 100 such as a SilTite™ coupling (FIG. 8) with respective columns 102, 103 inserted into passages 41, 51 to firmly and squarely abut the disc 60 about the hole 61. To facilitate the seal, the faces of disc 60 are smooth, polished or lapped. One option is to cleave disc 60, if it were made out of glass and depending on its length. The coupling is secured by rotating the nuts 110 (FIG. 8) to clamp the respective biconical ferrule 105 onto the capillary.

An example of a SilTite™ coupling is disclosed in U.S. Pat. No. 8,128,131, the entire disclosure of which is incorporated herein by reference.

FIG. 5 depicts an embodiment 10' similar to that of FIGS. 1-4 except that the tapered portion of the bore 40, 50 is not included. This embodiment is suitable for use with a coupling system such as the nanoViper assembly, as depicted in FIG. 6, or the Matrix assembly.

In the embodiments illustrated in FIGS. 1-5, the components are diffusion bonded to form a permanent assembly. In an alternative arrangement 10" (FIG. 7), one body or the other may have a greater diameter and be extended at 90 the inner end to form an internally threaded opening 92 to receive a correspondingly threaded outer surface of the other body. A screwed assembly of this kind is depicted in FIG. 7, again as part of a SilTite™ coupling assembly 100".

Figure 9:
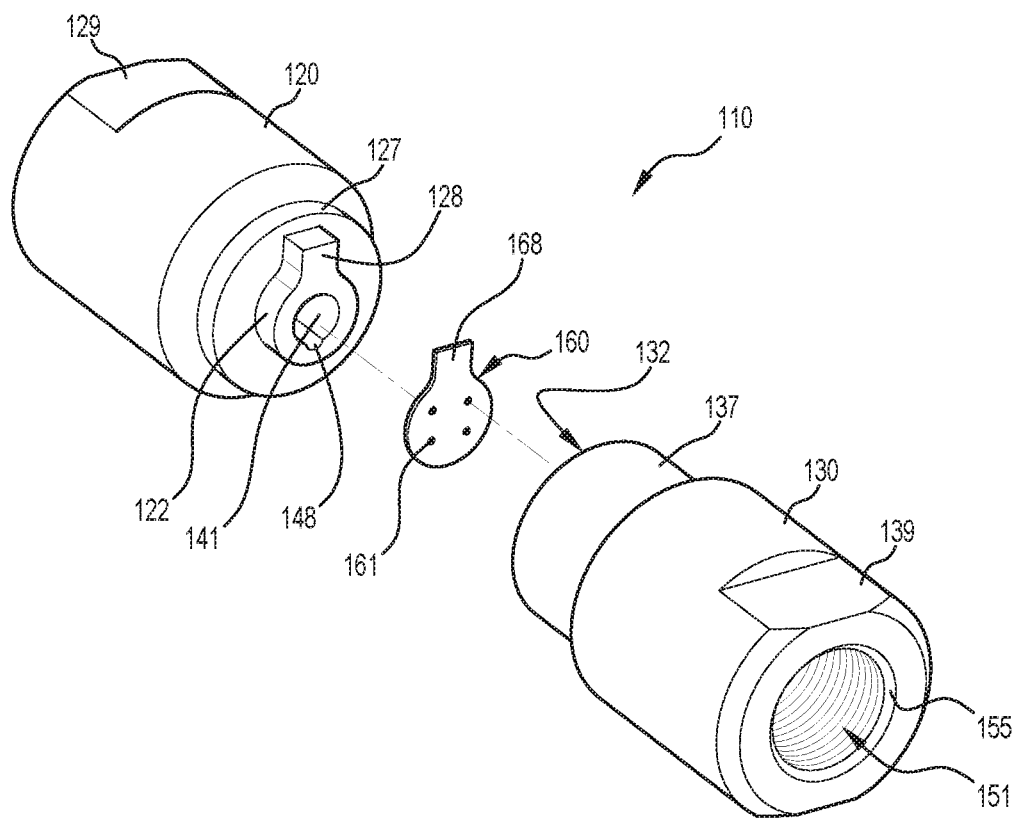
FIG. 9 is an exploded perspective view similar to FIG. 1 of a further embodiment of the invention for use with multi-lumen tubing.

FIG. 9 depicts a further embodiment 10 for use with multi-lumen tubing. In this embodiment, like parts are indicated by like reference numerals preceded by a "1". In this case, shim/plate or disc 160 has a square array of four holes 161. Correct alignment of the lumens of the tubing and the holes 161 is achieved by keyed engagements between the plate 160 and the bodies 120, 130, and between the bodies and the tubes. The former of these keys is provided by engaging radial tabs 168, 128 on the plate 160 and on spigot 122, with a matching radial channel (not visible) on recess 132 of reduced diameter inner portion 137. The other key is between a longitudinal groove 148 of semi-circular cross-section along each passage 141, 151, and a rib on the respective tube to rotationally align the tube lumens with holes 161.

It will be appreciated that the illustrated liquid junction assemblies have significant advantages over prior arrangements. Although multicomponent rather than integral, it may still be provided in a diffusion bonded permanent assembly but the manner in which the hole is provided between the capillary bores is more accurate and simpler. By readily providing good alignment on the axis of the system between the hole and the capillary columns, accidental dead volume is minimized or even potentially eliminated, a valuable advantage in analysis at micro and nano-scales. As depicted in FIGS. 6-8, the liquid junction assembly is readily compatible with a variety of coupling systems.

Another advantage of this approach to providing a liquid junction is that a variety of combinations of hole diameters, end fittings and ports could be selected from a kit of selectable parts.

There is complete flexibility in the materials employed to suit different applications. In the principal embodiment described above, the three components are metal so as to permit diffusion bonding. A suitable metal for the disc is 300 or 400 series stainless steel, but titanium would also be suitable. The disc could alternatively be formed in a ceramic, a glass such as borosilicate or quartz, or a polymer such as PEEK or filled PEEK. The components could be all glass.

The respective bodies 20, 30 may be made in a conductive material in support of electrospray. For other applications, the bodies 20, 30 and/or the disc 60 might be made of titanium, or of a polymeric material or materials that may or may not be filled with other materials such as conductive fillers to allow for any inert yet conductive connection. Conductivity might be optimized by plating or doping of the disc and/or the bodies or any combination thereof. The assembly could be compatible with ultra-high pressure liquid chromatography and is readily manufacturable as an ultra-low dead volume union in the low nano liter range.

It will be understood that the invention disclosed and defined in this specification extends to all alternative combinations of two or more of the individual features mentioned or evident from the text or drawings. All of these different combinations constitute various alternative aspects of the invention.

What is claimed is:

1. A liquid junction assembly for providing a flow connection between two tubular conduits, comprising:
    first and second bodies defining respective first and second elongated passages of respective first and second cross sections to receive and locate the respective tubular conduits, with the first and second passages being open at respective faces of the bodies;
    a plate with at least one hole therethrough of a third cross section smaller than said first and second cross sections, wherein the plate is a disc, the disc having a thickness in the range of 25-100 µm; and
    a seat for the plate, defined in one or both faces of said bodies;
    wherein the bodies and the plate are assembled with the faces opposed and with the plate in the seat such that the plate is in engagement with both of the opposed faces and the elongated passages and the at least one hole are aligned;
    wherein the first and second bodies and the plate are metal so as to permit diffusion bonding; and
    wherein the metal bodies and the metal plate are diffusion bonded at interfaces of the metal bodies and between each face of the metal plate and the opposed face of the adjacent one of the first and second metal bodies.

2. A liquid junction assembly according to claim 1 wherein the first and second metal bodies are discrete bodies.

3. A liquid junction assembly according to claim 1 wherein the elongated passages are cylindrical.

4. A liquid junction assembly according to claim 1 wherein the at least one hole is a series or matrix of holes.

5. A liquid junction assembly according to claim 1 wherein the plate exhibits smooth parallel faces about the hole or holes, and the assembly is configured so that when the conduits are correctly located in the elongated passages, they squarely abut the respective sides of the plate so as to minimize any dead space and to accurately align the inner diameters of the conduits with the hole or holes in the plate.

6. A liquid junction assembly according to claim 1 wherein the elongated passages are of a diameter in the range of 0.5 mm-2 mm and each hole or holes is of a diameter in the range 10 µm-200 µm.

7. A liquid junction assembly according to claim 1 incorporated in a coupling assembly in which respective tubular conduits are located in the elongated passages and securely joined within the liquid junction assembly.

8. A liquid junction assembly for providing a flow connection between two tubular conduits, comprising:

first and second bodies defining respective first and second elongated passages of respective first and second cross sections to receive and locate the respective tubular conduits, with the first and second passages being open at respective faces which are defined on a spigot of the first body and within a recess of the second body;

a plate with at least one hole therethrough of a third cross section smaller than said first and second cross sections, wherein the plate is a disc, the disc having a thickness in the range of 25-100 μm; and a seat for the plate defined by said recess;

wherein the bodies and the plate are assembled with the faces opposed with the spigot within the recess and the plate in the seat between said opposing faces, and the elongated passages and the at least one hole aligned;

wherein the first and second bodies and the plate are metal so as to permit diffusion bonding; and wherein the metal bodies and the metal plate are diffusion bonded at interfaces of the metal bodies and between each face of the metal plate and the opposed face of the adjacent one of the first and second metal bodies.

9. A liquid junction assembly according to claim 8 wherein the first and second metal bodies are discrete bodies.

10. A liquid junction assembly according to claim 8 wherein the elongated passages are cylindrical.

11. A liquid junction assembly according to claim 8 wherein the at least one hole is a series or matrix of holes.

12. A liquid junction assembly according to claim 8 wherein the plate exhibits smooth parallel faces about the hole or holes, and the assembly is configured so that when the conduits are correctly located in the elongated passages, they squarely abut the respective sides of the plate so as to minimise any dead space and to accurately align the inner diameters of the conduits with the hole or holes in the plate.

13. A liquid junction assembly according to claim 8 wherein the elongated passages are of a diameter in the range of 0.5 mm-2 mm and each hole or holes is of a diameter in the range 10 μm-200 μm.

* * * * *